es Patent [19] [11] 3,943,594
Alvin [45] Mar. 16, 1976

[54] ROTARY BRUSH FOR ROAD-CLEANING MACHINES

[76] Inventor: Pierre L. Alvin, route de Limoges Mougon, 79230-Prahecq, France

[22] Filed: Dec. 2, 1974

[21] Appl. No.: 528,906

[30] Foreign Application Priority Data
  Dec. 10, 1973  France .............................. 73.44009

[52] U.S. Cl. ..................................... 15/180; 15/198
[51] Int. Cl.² ...................... A46B 13/02; A46B 7/08
[58] Field of Search ............................ 15/174–183, 15/198, 200

[56] References Cited
UNITED STATES PATENTS

| | | | |
|---|---|---|---|
| 1,393,332 | 10/1921 | Wimmer | 15/200 UX |
| 1,497,921 | 6/1924 | Levedahl | 15/180 X |
| 1,967,651 | 7/1934 | Anderson | 15/180 |
| 2,565,047 | 8/1951 | Rowland | 15/198 |

FOREIGN PATENTS OR APPLICATIONS

| | | | |
|---|---|---|---|
| 6,713,452 | 4/1968 | Netherlands | 15/180 |

*Primary Examiner*—Peter Feldman
*Attorney, Agent, or Firm*—Bucknam and Archer

[57] ABSTRACT

This invention relates to a rotary brush for road-cleaning machines, constituted by a support disc to which are attached a plurality of bundles of fibres, each of the fibres which constitute said bundles being of oblong section and being so orientated that the largest dimension of its section extends perpendicularly to a straight line passing through the point of fixation of said fibre to the support disc and tangential to a circle of determined radius, centered on the axis of the brush.

The invention finds application in the field of industrial brush-making.

3 Claims, 2 Drawing Figures

ROTARY BRUSH FOR ROAD-CLEANING MACHINES

The present invention relates to a rotary brush for adaptation to road-cleaning machines using side brushes for cleaning, scraping and sweeping gutters and curbs.

The brushes generally used up to the present time for this type of work are constituted by a disc supporting fibres which are most often made of steel and of oblong section. These fibres are fixed to the support in conventional manner by inserting a tuft of fibres forming a loop into a blind or through-hole provided to this end in the support disc, said tuft being fixed to the disc by means of nails, staples, pins or stitching.

The orientation of these fibres wih respect to the resistant stress is of two types. The one most currently used is the "flat" presentation of the fibre wih respect to the resistant stress, i.e. the greatest dimension of the section is substantially perpendicular to this stress. The drawback of this orientation resides in the fact that the fibres offer little resistance in flexion and their scraping power is considerably reduced.

Fibres are also found which are orientated "edgewise", i.e. which present their smallest dimension of section perpendicularly to the resistant stress. Although in this case their scraping power is increased, the influences to which they are subjected on coming across irregularities on the ground tend to cause them to bend and twist in all directions to such an extent that permanent deformations are formed which rapidly render them useless.

The invention intends to remedy these drawbacks by proposing a device whose scraping power is greater than that of the brushes of the first type, this rendering it highly efficient and long-lasting.

To this end, the invention therefore has for its object a rotary brush for adaptation to road-cleaning machines, constituted by a support disc to which are attached a plurality of bundles of fibres.

According to the invention, each of the fibres constituting the above-mentioned bundles is of oblong section and is so orientated that the largest dimension of its section extends perpendicularly to a straight line passing through the point of fixation of said fibre to the support disc and tangential to a circle of determined radius centered on the axis of the brush.

In a preferred embodiment of a brush according to the invention the support disc is provided with at least two concentric series of holes, there being the same number of holes for each series, disposed with respect to one another so that two adjacent holes respectively selected from the inner series and outer series are centered on the above-mentioned straight line, each of the bundles of fibres being shaped as a staple, of which each of the arms is introduced into the above-mentioned inner and outer holes respectively.

In addition, the assembly of a bundle on the support disc is such that, in rotation, the inner arm of the bundle precedes the outer arm.

Finally, in a variant embodiment, the axes of the two holes of the first and second series, through which one and the same bundle passes, are parallel and inclined, in a plane perpendicular to the support disc containing them, by a determined angle with respect to the support disc.

The invention will be more readily understood on reading the following description wih reference to the accompanying drawings, in which.

Figure 1:
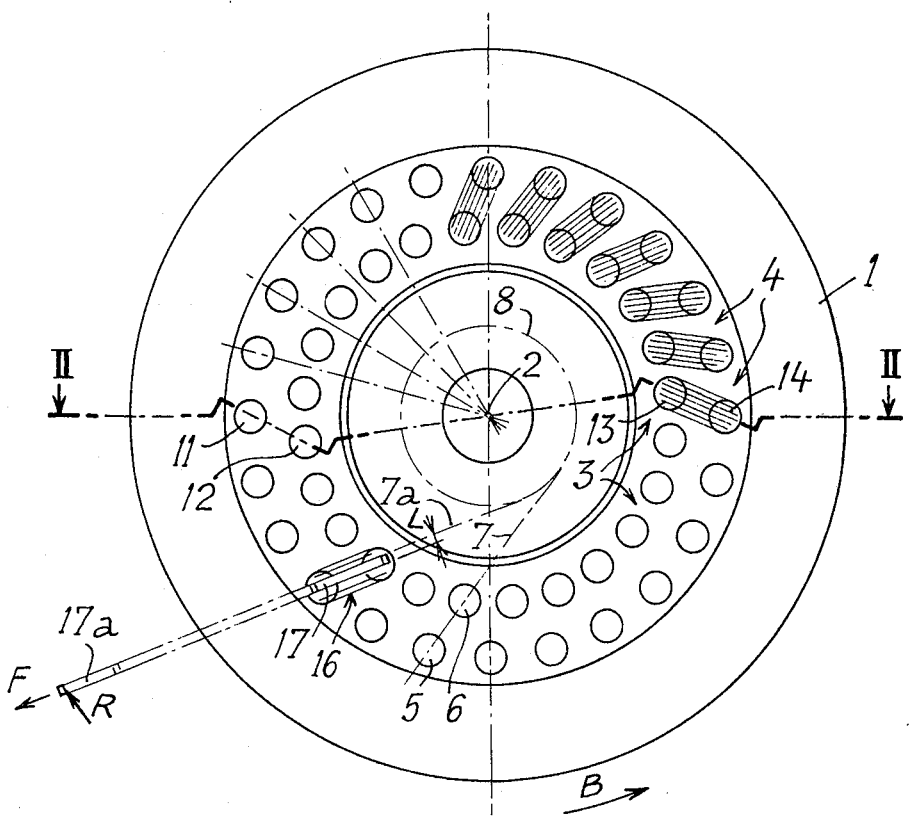
FIG. 1 is a part schematic plan view of a brush according to the invention.

Referring firstly to FIG. 1, a support disc 1 is shown which may be attached to a road-cleaning machine (not shown) which may rotate it about its axis 2. This disc 1 is provided with two concentric series of holes 3 and 4. The inner series 3 has the same number of holes as the outer series 4. These holes are so disposed that, by choosing any one of the holes of the outer series 4 - e.g. hole 5, and the hole, e.g. hole 6, adjacent hole 5 contained in the inner series 3, the straight line 7 which passes through each of the axes of the holes 5 and 6 remains tangential to a circle 8, of predetermined radius and centred on axis 2. The factors to be taken into account in the determination of the radius of circle 8 are mainly the linear speed of each of the fibres - or speed of rotation of the brush and the average distance of the fibres from axis 2, and the mechanical characteristics of said fibres.

Figure 2:
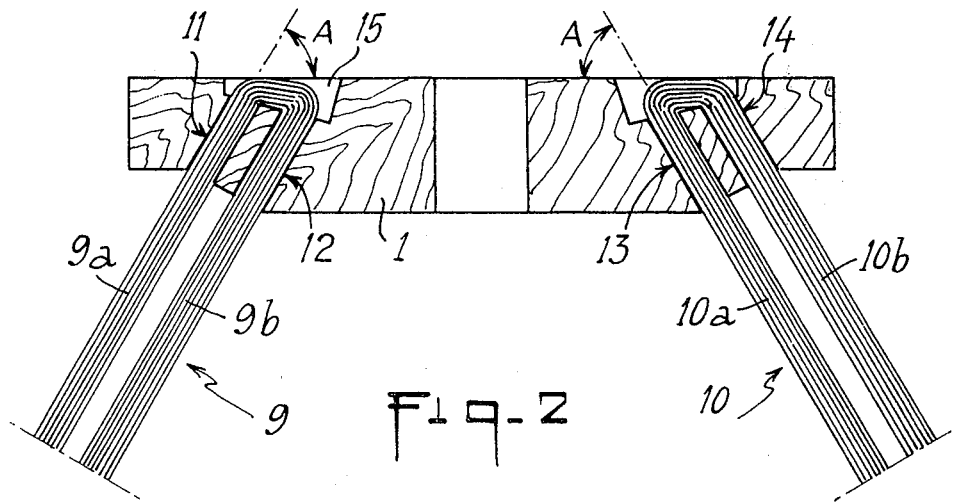
FIG. 2 is a view in section along the line II— II of FIG. 1.

FIG. 2 shows how each of the bundles of fibres constituting the brush is disposed. Each bundle 9 and 10 is shaped as a staple of which the arms 9a, 9b and 10a, 10b are introduced respectiely into holes 11, 12, 13 and 14. This introduction may be accompanied by a slight compression of the fibres at the level of the holes in order to avoid their sliding with respect to one another. In any case, the bundles mounted as shown in FIG. 2 are in abutment on a cover (not shown) which covers the disc. This cover may be either separate or may be the member driving the brush by the road-cleaning machine to which this brush is attached.

To allow a satisfactory attachment of the brush to the machine, a groove 15 has been provided in the disc 1, which constitutes a housing for the loops of the bundles so that they do not project above the disc.

Finally, it will be noted from FIG. 2 that the holes are inclined by an angle A wih respect to the plane of the disc 1. They may of course be perpendicular to the disc, but the advantage of such a disposition resides in the increase in the surface covered by the brush and by the possibility of access of this latter into corners.

The fibres which constitute the bundles may be of several types, either of synthetic material or steel. In the present case, a steel fibre has been chosen of oblong section, for example rectangular, which is currently used in the manufacture of brushes.

Reference is again made to FIG. 1 in which 16 schematically represents a bundle made with this type of fibre. The dimensions of a fibre 17 have been exaggerated to facilitate understanding of the drawing. It is therefore seen that the largest dimension L of the section of the fibre 17 is in a direction substantially perpendicular to the straight line 7a which corresponds to the same definition as the straight line 7.

Finally, FIG. 1 defines a direction of rotation B of the brush. It will be noted that, for this direction of rotation, the inner arm of each of the bundles precedes the outer one. This condition is necessary for the brush according to the invention to operate correctly, as will be explained hereinafter.

It will be imagined that the end 17a of the fibre 17 is in contact with the ground. Rotating in the direction of arrow B, this fibre is subjected to a resistant stress due to its rubbing the ground, the resultant of which is orientated substantially in the direction of arrow R. It will be noted that, in view of the orientation of the fibres 17 with respect to the disc, this stress R tends to separate the end 17a from he centre of rotation 2, in the direction F. This therefore results in the fibre bending in the vertical direction parallel to the axis of rotation of the brush which does not affect its resistance in the tangential direction. Moreover, the fibres do not tend to bend and twist. It is certain that if the brush rotated in the opposite direction, the resistant stress applied to the end of the fibres would tend to return the fibre towards the inside of the brush and therefore to subject it to twisting and flexion stresses which would rapidly lead to permanent deformations, therefore to deterioration. For a brush having to rotate in the direction opposite the one indicated by arrow B, the straight line such as 7 defining the positon of each of the holes of series 3 and 4 with respect to one another and therefore the position of the bundles of fibres of which the arms pass into the two holes connected by said straight line, must be inclined in the other direction. More generally, therefore, the hole through which the inner arm of a bundle passes precedes, in the selected direction of rotation, the hole through which the outer arm of the same bundle passes.

It will also be noted that the value of the radius of the circle 8 determines the inclination of the fibres such as 17 with respect to the resistant stress which they may encounter. The relationship between this inclination, thus the above-mentioned radius and the mechanical characteristics of the fibres and their linear speed which must be taken into account to obtain an optimum efficiency of the brush is more readily understood.

The brush according to the invention therefore has very considerable scraping power, due to these arrangements, whilst allowing a smooth operation, the fibres not being able to jump in view of their determined orientation as a function of the direction of rotation.

The consequence of this smooth work is an advantageous increase in the life duration of the brush according to the invention. Finally, the brush according to the invention is advantageous from the production point of view, since it is simple and does not necessitate any nailing, gluing or other mode of fixing the fibres to the support disc.

It is obvious that such a brush may include 4, 6 . . . series of holes grouped in two's to constitute several concentric circles of bundles.

The invention finds advantageous application in the field of industrial brush-making.

What I claim is:

1. A rotary brush for road-cleaning machines, constituted by a support disc to which are attached a pluraliy of bundles of fibres, wherein each of the fibres constituting the said bundles is of oblong section and is so oriented that the largest dimension of its section along its entire length extends perpendicularly to a straight line passing through the point of fixation of said fibre to the support disc, which line is tangential to a circle of predetermined radius, centered on the axis of the brush, the fibres being inclined towards the outside in the plane perpendicular to the support disc, each of the bundles of fibres being shaped as a staple having an inner arm and an outer arm, during rotation the inner arm of each of the bundles preceding the outer arm.

2. A rotary brush as claimed in claim 1, wherein the support disc is provided wih at least two concentric series of holes, there being the same number of holes for each series, disposed with respect to one another so that two adjacent holes respectively selected from the inner series and the outer series are centred on the above-mentioned straight line, each of the bundles of fibres being shaped as a staple, of which each of the arms is introduced into said inner and outer holes respectively.

3. A rotary brush as claimed in claim 2, wherein the axes of the two holes of the first and second series, through which one and the same bundle passes, are parallel and inclined, in a plane perpendicular to the support disc containing them, by a predetermined angle with respect to the support disc.

* * * * *